(No Model.) 2 Sheets—Sheet 1.

E. COX-WALKER & A. A. C. SWINTON.
ELECTRIC BELL.

No. 414,612. Patented Nov. 5, 1889.

Witnesses.
Dennis Lumby
Robert Everett

Inventors.
Edward Cox-Walker.
Alan A. C. Swinton
By James L. Norris
Atty.

(No Model.) 2 Sheets—Sheet 2.
E. COX-WALKER & A. A. C. SWINTON.
ELECTRIC BELL.
No. 414,612. Patented Nov. 5, 1889.
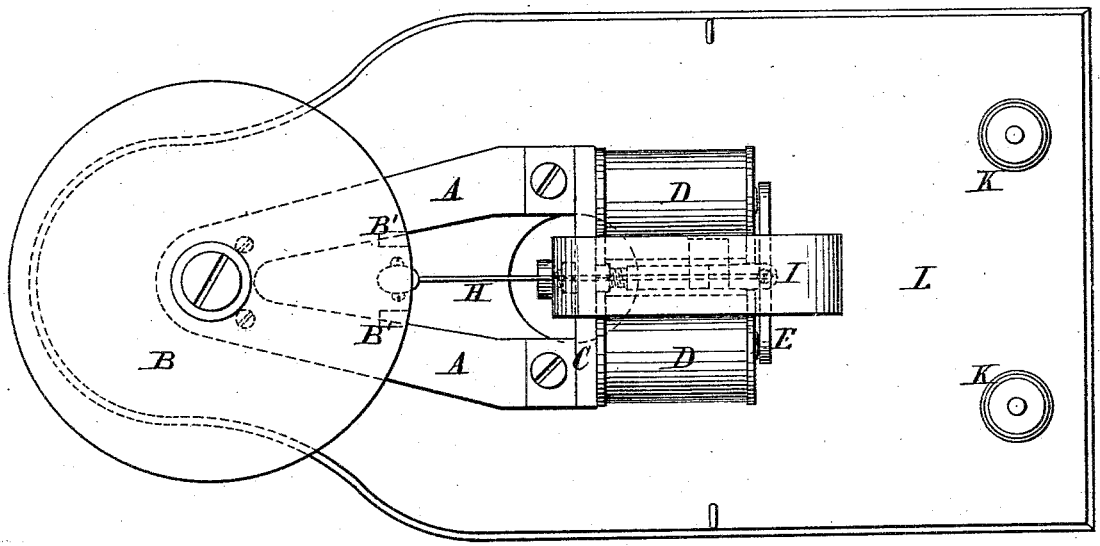
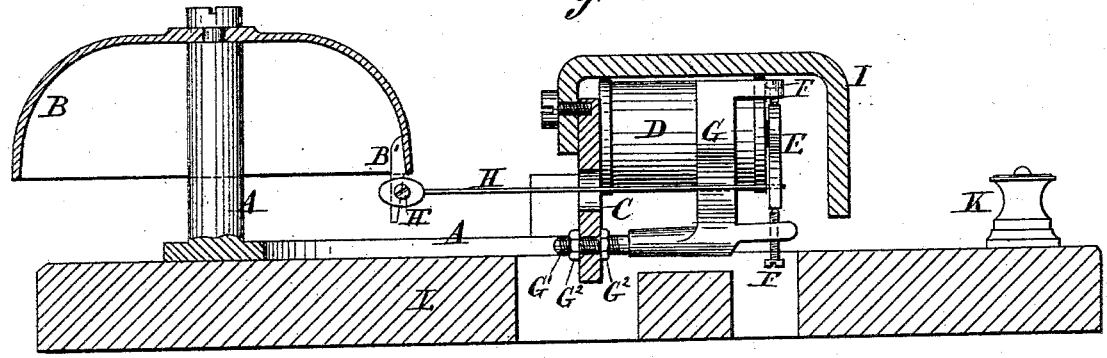
Witnesses,
Dennis Sumby.
Robert Everett.
Inventors,
Edward Cox-Walker
Alan A. C. Swinton
By James L. Norris
Atty.

UNITED STATES PATENT OFFICE.

EDWARD COX-WALKER AND ALAN A. C. SWINTON, OF WESTMINSTER, COUNTY OF MIDDLESEX, ENGLAND.

ELECTRIC BELL.

SPECIFICATION forming part of Letters Patent No. 414,612, dated November 5, 1889.

Application filed March 11, 1889. Serial No. 302,854. (No model.) Patented in England June 21, 1888, No. 9,046; in France February 27, 1889, No. 196,348, and in Belgium March 5, 1889, No. 85,261.

*To all whom it may concern:*

Be it known that we, EDWARD COX-WALKER and ALAN ARCHIBALD CAMPBELL SWINTON, subjects of the Queen of Great Britain, and both residing at 66 Victoria Street, Westminster, in the county of Middlesex, England, have invented new and useful Improvements in Electric Bells, (for which we have obtained patent in France, No. 196,348, dated February 27, 1889; Belgium, No. 85,261, dated March 5, 1889, and Great Britain by an application for patent, which patent when granted will bear date June 21, 1888, No. 9,046,) of which the following is a specification.

Our invention relates to an improved construction of electric bells to be worked by electrical current from magneto-electric generators or other suitable generators of electrical currents.

Our invention has for its object to obtain greater compactness and simplicity in construction and increased efficiency in such apparatus; and it consists, mainly, in combining on one and the same metal frame the following parts: two bobbins with iron cores, which are secured at one end to an iron plate or bracket on the frame, thus forming with the plate or bracket a horseshoe electro-magnet, a bar-shaped armature held on pivots in front of the poles of the electro-magnet by an arm secured in an adjustable manner to the bracket of the frame, a striker-arm fixed to the middle of the armature and projecting forward between the two limbs of the electro-magnet, a bell fixed to a bracket or standard on the frame, and a permanent magnet fixed at one end to the plate connecting the cores of the electro-magnet, and after passing along over or under the latter having its other end bent down behind the armature, so as to polarize this and the electro-magnet. This construction of magneto-electric bells is shown in two modifications on the accompanying drawings.

Figure 1:
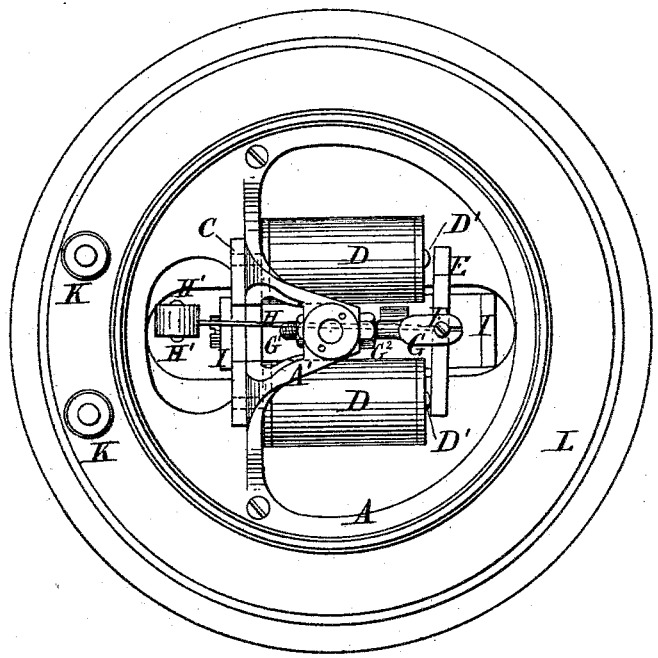
Figure 2:
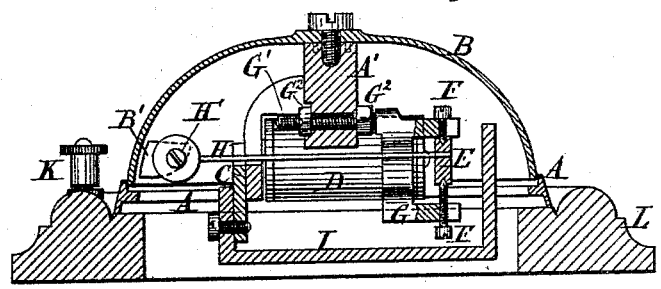

Figure 1 is a plan of an electric bell embodying our invention. Fig. 2 is a sectional elevation of the same. Fig. 3 is a plan of a modification. Fig. 4 is a longitudinal section of the modified bell.

In the arrangement shown in plan and sectional elevation at Figs. 1 and 2, A is the metal frame, of circular form, having a bracket A' projecting up from it, which serves, first, as support for the bell B, which covers the entire mechanism, as shown, and, secondly, as attachment for the iron plate C, which forms the yoke of the electro-magnet. To this plate are fixed the cores D' of the electro-magnet bobbins D, which consequently stand out from the bracket A' and have in front of their free ends the armature E, supported on pivots F, screwed through the fork of an arm G, carried by the bracket A'. This arm has a screwed stem G' passing through a hole in the bracket A' and having on each side thereof a nut $G^2$, so that by means of these the position of the arm G, and consequently the distance of the armature from the electro-magnet, can be adjusted. The armature has fixed to its middle a striker-stem H, which passes through a slotted hole in the arm G and between the two bobbins D D, and has a head carrying two adjustable screw-studs H'. This head is situated between two lugs B' B', projecting from the inner surface of the bell, so that on a vibrating motion being imparted to the striker by the armature the studs H' in beating alternately against the lugs B' effect the ringing of the bell. The beat of the striker is regulated by adjusting the screw-studs H'. By this arrangement we obtain the same result that has hitherto only been obtained with two bells—namely, the emission of a sound at each single beat of the hammer. To the plate C is fixed one end of a permanent magnet I, which extends beneath the electro-magnet of the other end thereof, where it is bent up behind the armature E, and is thus made to polarize the electro-magnet and armature, so that when the bell is not in action the armature remains in contact with the limb by which it was last attracted.

The coils of the electro-magnet are connected in any suitable manner with the terminals K K on the base L, of wood or other suitable material.

By mounting the whole of the mechanism on one and the same metal frame the advantage is gained that there can occur no irregularities of action, such as sometimes take place when the parts are mounted separately on a wood or similar base, owing to the expansion and contraction or warping of the latter.

In the modification shown in plan and longitudinal section at Figs. 3 and 4 the several parts are all substantially the same as described with reference to Figs. 1 and 2, with the exception that the frame A is of a different form and carries the bell B on a pillar A' away from the other mechanism. C is the iron plate forming the yoke of the electro-magnet D D, and carrying the adjustable forked arm G, that carries the armature E. The permanent magnet I, attached at one end to the plate C, is in this case carried over the top of the electro-magnet. The other parts are all designated by the same letters of reference as the corresponding parts of the first arrangement, and need not be further described.

Having thus described the nature of our invention and the best means we know of carrying the same into practical effect, we claim—

1. In an electric bell, a metal frame to which are secured the following parts: two bobbins with iron cores secured to an iron plate forming the yoke of the electro-magnet and fixed to the said frame, an armature carried by a forked arm adjustably attached to the frame, a striker attached to the armature and passing between the two bobbins of the electro-magnet, and a bell mounted on the metal frame, substantially as herein described.

2. In an electric bell, a metal frame to which are secured the following parts: two bobbins with iron cores secured to an iron plate forming the yoke of the electro-magnet and fixed to the said frame, an armature carried by a forked arm adjustably attached to the frame, a striker attached to the armature and passing between the two bobbins of the electro-magnet and a bell mounted on the metal frame, and a permanent magnet attached at one end to the said iron plate and extending along the electro-magnet, so as to polarize the same and the armature, substantially as described.

3. In an electric bell, the combination of a circular metal frame A, with bracket A', carrying a bell B, electro-magnet C D D', armature E, with striker H, carried by arm G, adjustably mounted on bracket A, and permanent magnet I, carried by plate C, substantially as described.

4. In an electric bell, the combination, with the bracket A', of a forked arm G, carrying a pivoted armature E, with striker H, in front of an electro-magnet C D D', said arm having a screwed stem G', provided with screw-nuts $G^2$ for adjusting the arm G and armature E relatively to the electro-magnet C D D', substantially as herein described.

5. In an electric bell, the combination of the frame A, bell B, having lugs B' B', electro-magnet C D D', pivoted armature E, an adjustable arm G, on which the armature is carried, and the striker H, attached to the armature and adapted to vibrate between the lugs on the bell, substantially as described.

In testimony whereof we have signed our names to this specification, in the presence of two subscribing witnesses, this 14th and 25th days of February, A. D. 1889.

E. COX-WALKER.
A. A. C. SWINTON.

Witnesses to the signature of Edward Cox-Walker:
THOS. BRAMLEY,
I. A. PORTERFIELD.

Witnesses to the signature of A. A. C. Swinton:
CHAS. D. ABEL,
JNO. P. M. MILLARD.